July 7, 1959 — W. G. BARTENFELD — 2,893,574
UNLOADING UNIT FOR CARGO VESSEL
Filed Oct. 22, 1956 — 4 Sheets-Sheet 1
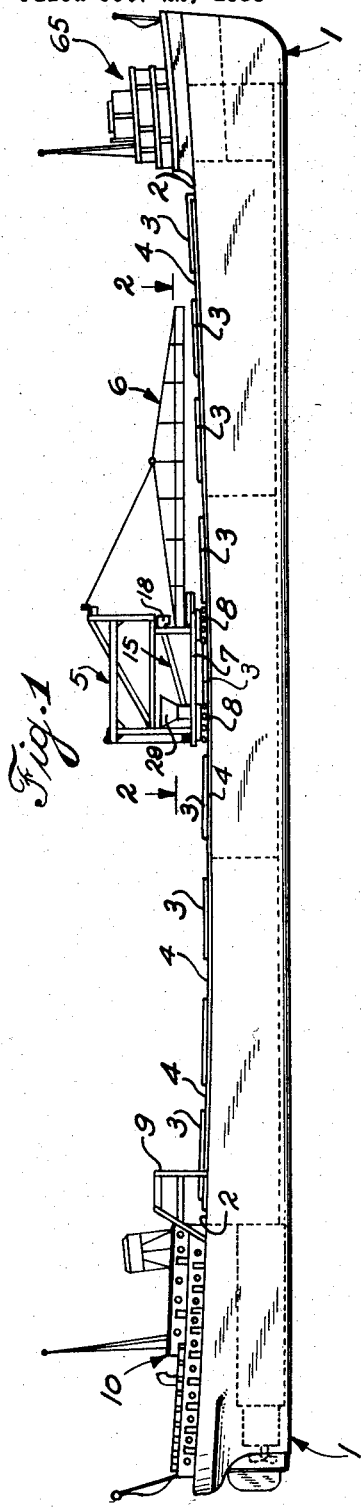
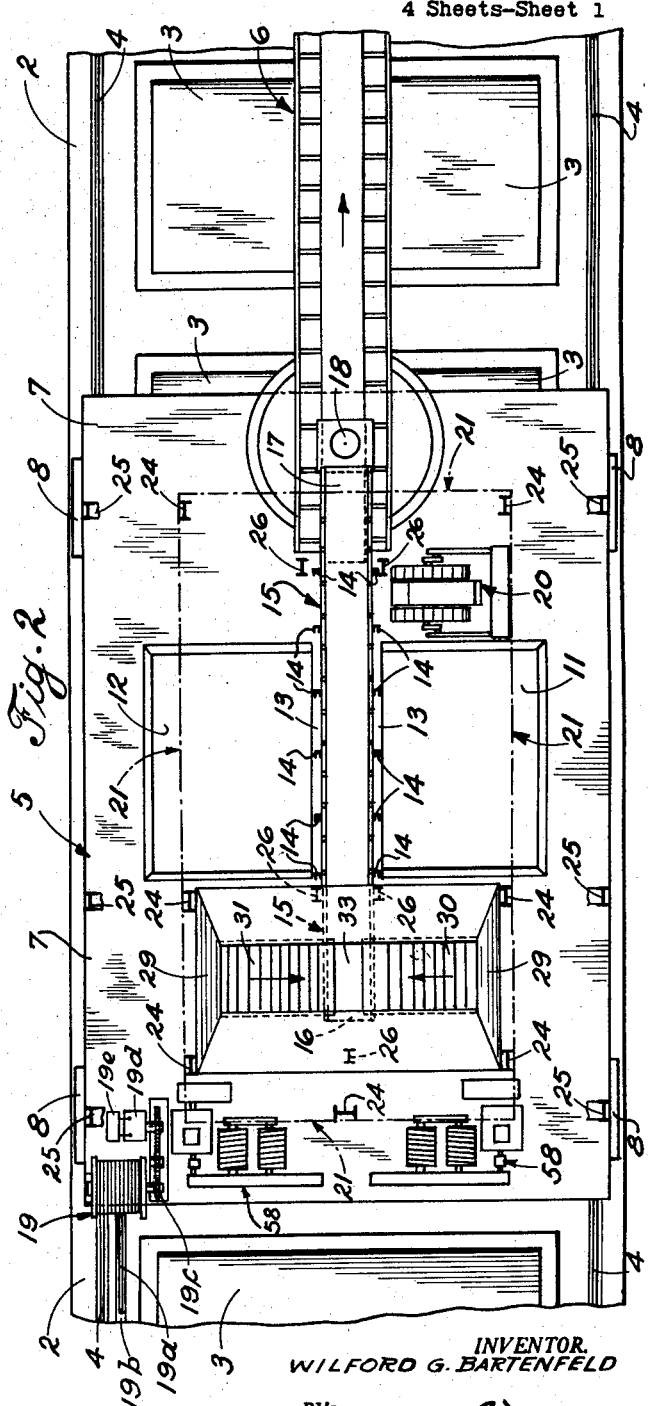
INVENTOR.
WILFORD G. BARTENFELD
ATTORNEYS

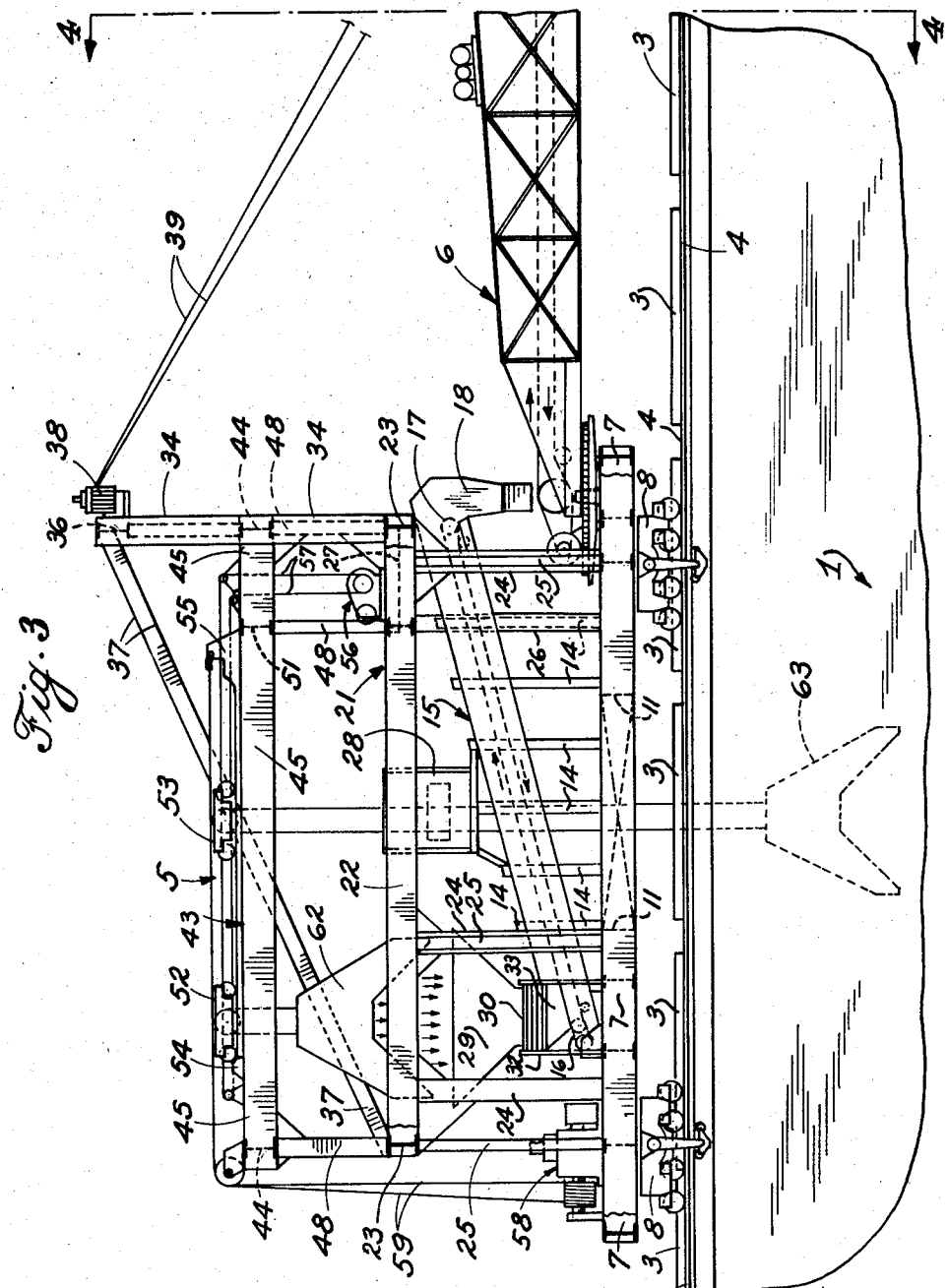

July 7, 1959 W. G. BARTENFELD 2,893,574
UNLOADING UNIT FOR CARGO VESSEL
Filed Oct. 22, 1956 4 Sheets-Sheet 3

INVENTOR.
WILFORD G. BARTENFELD
BY
ATTORNEYS

United States Patent Office 2,893,574
Patented July 7, 1959

2,893,574

UNLOADING UNIT FOR CARGO VESSEL

Wilford G. Bartenfeld, Lakewood, Ohio

Application October 22, 1956, Serial No. 617,414

9 Claims. (Cl. 214—15)

This invention relates to an unloading unit for a cargo vessel, particularly an unloading unit of a kind adapted to travel lengthwise of the deck on rails paralleling the longitudinal axis of the ship.

Such unloading units are described in two prior applications of Wilford G. Bartenfeld, Serial No. 553,849, filed December 19, 1955, now Patent No. 2,827,180, and Serial No. 560,939, filed January 24, 1956, now Patent No. 2,827,181. The unloading unit of the present application constitutes an improvement over those of the prior applications in the sense that it is comparatively low in height, thus permitting of its use on lake ships intended for loading by means of shore installations that extend over the ship high above the deck. In the case of ocean vessels, which as a rule are rather wide, there is less of a problem, but on lake ships a superstructure that is high in relation to the width of the vessel may preclude loading by mechanical ship loaders of types now in use in certain ports, particularly on the Great Lakes.

The invention has for its principal object to reduce the overall height of the unloading unit. In the main, it does so by providing a centerline conveyor disposed not too far above the deck of the vessel in the space between two pairs of overhead ways which support bucket-carrying trolleys that can be moved longitudinally of the vessel. The buckets themselves may, if desired, be so disposed that their cleavage planes extend at right angles to the conveyor, but in vessels of sufficient beam, such as ocean-going ships, they may parallel the longitudinal axis of the vessel. In the preferred embodiment of the invention, the centerline conveyor is so located that its receiving end is at or near one end of the unloading unit and its discharging end is at or near the opposite end of the unloading unit, usually over the inboard end of the unloading boom.

Other objects, advantages and features of the invention will be apparent from the description which follows and from the accompanying drawings, in which:

Figure 1 is a side elevation of a lake ship incorporating the unloading unit of the present invention.

Figure 2 is a plan of the unloading unit seen as if from line 2—2 of Figure 1 but on a larger scale.

Figure 3 is a side elevation of the unloading unit on the same scale as in Figure 2.

Figure 4:
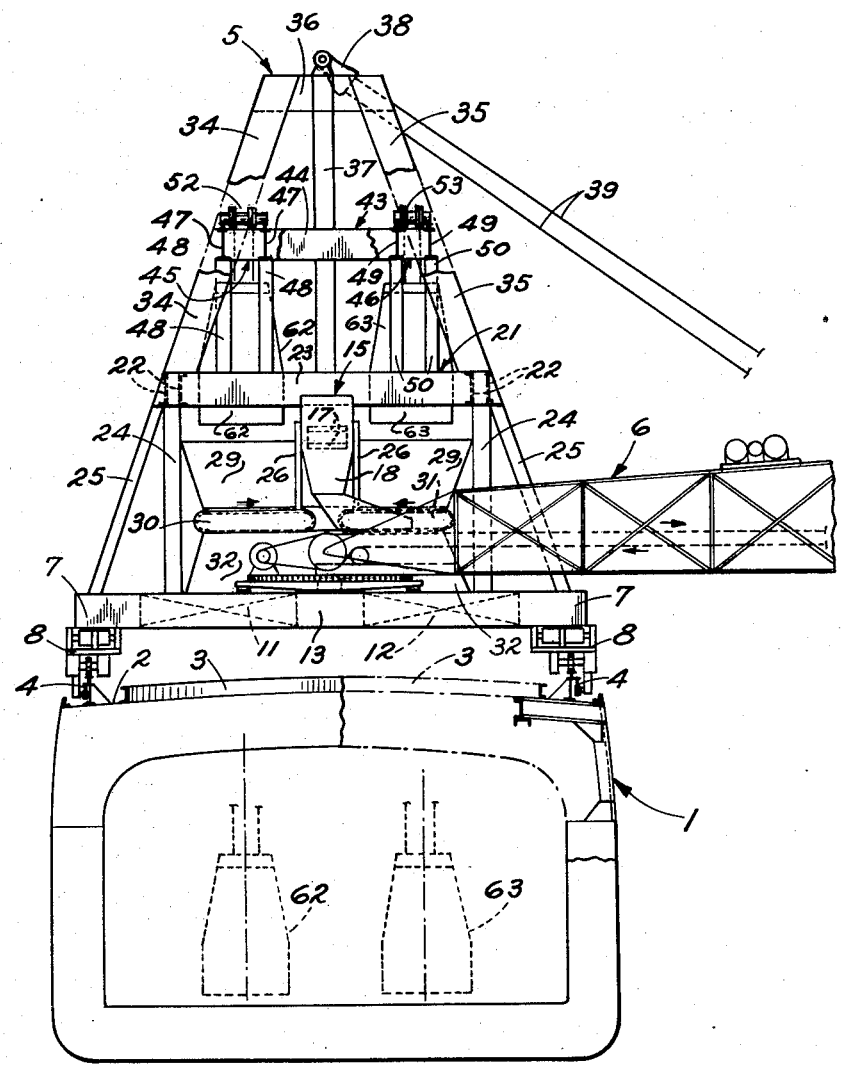
Figure 4 is an end elevation of the unloading unit seen as if from line 4—4 of Figure 3 but with the boom shown as extending at an angle to the side of the vessel.

In the embodiment of the invention illustrated in Figures 1 to 4, vessel 1 takes the form of a cargo ship of a type used on the Great Lakes. It has a deck 2 in which is a series of hatches 3 each of which extends athwartship from one side of the vessel to the other. Flanking this series of hatches are rails 4 for a moveable crane 5 provided with an unloading boom 6 equipped with a belt conveyor for moving cargo from the inboard to the outboard end of the boom. Beneath the framework of the crane is a base 7 of the platform type supported on self-locking trucks that ride on tracks 4, there being a double truck 8 of this type at each of the four corners of the base. A cage 9 for receiving and securing the crane in position when the vessel is at sea is located between after house 10 and the nearest of the series of hatches: see Figure 1.

Boom 6 is adapted for arcuate movement of approximately 180° in a horizontal plane; i.e., 90° on each side of the central position in which it is shown in Figures 1, 2 and 3. Thus it can discharge cargo with equal facility over either side of the vessel, port or starboard. This arcuate movement is brought about in conventional fashion by means of a bull gear mounted on a suitable pin, the bull gear being turned by means of a pinion (not shown). The boom may also be elevated to an angle of about 18° from the horizontal, thus facilitating stockpiling of the cargo on a dock to which the vessel may be moored.

As indicated in Figure 2, base 7 is provided with two spaced openings 11 and 12 by means of which access may be had to the hold of the vessel through hatches 3. Over the centerline of the vessel, openings 11 and 12 are separated by a narrow bridge-like portion 13 which connects the front end and the rear end portions of the base. In bridge-like portion 13 are two series of uprights 14 arranged as shown. Seen as in Figure 3, they are of progressively greater height from the left-hand end to the right-hand end of each series. Located between and supported by uprights 14 is a conveyor 15 which extends at a shallow angle to the horizontal, not more than about 15°, from the rear end portion to the front end portion of platform 7.

Conveyor 15 is so disposed that its receiving end 16 is just above the level of base 7. Its discharging end 17 is directly over a hopper 18 located above the inboard end of boom 6. From its receiving end to its discharging end, skirts flank the sides of the conveyor. It may be fully enclosed, if desired, although this is not ordinarily necessary. Because it is located above the centerline between the sides of the framework, it may aptly be described as a centerline conveyor.

On base 7 on opposite sides of the centerline are a power driven take-up reel 19 for the cable used in supplying electric current to the crane and a bulldozer 20 for use in cleaning up the hold, the former positioned on the rear end portion and the latter on the front end portion of the base. From reel 19, cable 19a drops downward to a trough 19b on deck 2. Associated with the take-up reel are gears 19c, a motor 19d, and a step-down transformer 19e for reducing the voltage from 2400 to 440 volts.

Supported from base 7 above conveyor 15 is a first horizontal frame 21, best seen in Figures 3 and 4. The position of this frame relative to the base is indicated by the diagrammatic representation of it in Figure 2, wherein its outline is shown in dotted lines. The sides of frame 21 are made up of box girders 22. These girders are connected at their ends by H-beams 23. The frame so formed is supported by seven pillars 24 the locations of which are indicated in Figure 2. Diagonal struts 25, six of which appear in Figure 2, are used to steady the superstructure. From base 7, five I-beams 26 extend upward where indicated, two of them on each side of centerline conveyor 15.

Supported by two of the I-beams 26 located in the front end portion of base 7 is a platform 27 (Figure 3) that extends athwartship between box girders 22. To the rear of platform 27, where it is supported from uprights 14, is a cab 28 for the operator or operators, who are enabled to see into the hold through the openings 11 and 12 on opposite sides of bridge-like portion 13. To the rear of cab 28, a transverse hopper 29 extends athwartship as indicated in Figure 2. It is supported by four of the seven pillars 24 and three of the five I-beams 26. At its bottom, hopper 29 incorporates two apron feeders 30 and 31 which move in opposite directions toward a central discharge zone above a second hopper 33 (Figure 3). Apron feeders 30 and 31 are supported from side plates 32, seen in Figures 3 and 4. Thus cargo emptied from above into hopper 29 is carried by apron feeders 30 and 31 to the common discharge zone over hopper 33, through which it discharges onto the receiving end 16 of centerline conveyor 15.

Rising above horizontal frame 21 at the front end of the crane is an A-frame made up of two diagonal plate girders 34 and 35 and a cross member 36 (Figure 4). Extending rearwardly from the apex of the A-frame is a stringer 37 which runs diagonally from the front end to the rear end of the crane. At the front end of the crane it is affixed to the A-frame. At the rear end of the crane it is attached to H-beam 23, which at this point is supported by one of the pillars 24. At the apex of the A-frame is a swiveling sheave block 38 from which lines 39 lead to boom 6.

Referring again to Figures 3 and 4, it will be seen that above horizontal frame 21 is another horizontal frame 43 which is substantially co-extensive with frame 21 as regards length but narrower than frame 21 as regards width. Frame 43 incorporates two H-beams 44, one at each end, of which the one at the forward end forms part of the A-frame. Running between H-beams 44 are two longitudinally extending bridges 45 and 46, the former consisting of two I-beams 47 supported from uprights 48 and the latter consisting of two I-beams 49 supported from uprights 50: see Figure 4. The sides of frame 43 are formed by the outside I-beams of bridges 45 and 46. Uprights 48 and 50 are mounted on and supported by H-beams 23 at the ends of frame 21. At the forward end of the crane, the A-frame and particularly plate girders 34 and 35 thereof help support frame 43, which is reinforced by the horizontally extending H-beam 51 indicated in dotted lines in Figure 3.

Bridge 45 mounts a pair of ways for a traveling trolley 52; similarly, bridge 46 mounts a pair of ways for a traveling trolley 53. These ways take the form of rails. As appears from Figure 4, the loci of the trolleys run lengthwise of the vessel over openings 11 and 12 in base 7. Stops 54 and 55 (Figure 3) limit the travel of the trolleys 52 and 53. Trolleys 52 and 53 are operated from two like motor and drum sets 56 mounted beneath the trolleys on platform 27 of frame 21. Lines 57 lead to the trolleys from motor and drum sets 56: see Figure 3.

Mounted on the rear end portion of base 7 are two other motor and drum sets 58, seen in Figures 3 and 4, from which lines 59 extend upward to trolleys 52 and 53. These lines, which pass over pulleys in the trolleys, are connected to cargo scoops 62 and 63 beneath trolleys 52 and 53, respectively. Preferably, these scoops take the form of clam shell buckets supported from lines 59 in such manner that the cleavage planes of the buckets extend athwartship; if so, the maximum dimension of each bucket when in its open position extends parallel to rather than transversely of the longitudinal axis of the vessel. Where this arrangement is used, the buckets present their ends rather than their sides to the front and rear of the crane: see Figure 4.

Because the buckets, as seen in Figure 4, are relatively narrow, the superstructure, particularly that portion of it above horizontal frame 21, may taper upward in the manner there shown, thus permitting the use of shore-mounted spouts for loading purposes. However, notwithstanding the fact that the longest dimension of each of the two buckets parallels the longitudinal axis of the vessel, there is little difficulty in dropping the buckets into the hold of the vessel through openings 11 and 12 in base 7. In Figure 3, bucket 63 is shown in dotted lines in its lowered position. From this position, it is raised by the operator by means of lines 59 and then moved lengthwise of the vessel on the ways forming part of bridge 46 into a position over hopper 29, into which it can then discharge. Bucket 62, shown in Figure 3 in discharging position, is operated independently of bucket 63 in similar fashion.

By this arrangement, the overall height of the unloading unit is reduced; consequently, its center of gravity is lowered. Hoppers 29 and 33, apron feeders 30 and 31, and the motor and drum sets 58 balance the weight of boom 6, providing good load distribution. Since these same units are supported on or from base 7, inspection and repair are facilitated and the use of units of large capacity becomes feasible. At the same time, the relatively shallow angle of centerline conveyor 15 permits of the handling of bulk cargo such as iron ore pellets that cannot be handled to advantage with angles greater than about 15°. When the vessel is at sea, the buckets can be stowed in the hold, permitting clear vision from wheel house 65 through crane 5 above horizontal frame 21.

Because base 7 is several feet above the deck of the vessel, it is possible to use the crane for removing and replacing the hatch covers. In this case, cables are strung from trolleys 52 and 53 to the hatch cover to be moved, which may then be lifted from its original position and transported to a different position on the deck of the vessel. Where several hatch covers must be removed, they may readily be stacked, if desired. If the vessel is to be unloaded, the crane may then proceed to those hatches from which cargo is to be removed, after which buckets 62 and 63 are brought into operation as already described. After the vessel has been unloaded, the crane may again be used to restore the hatch covers to their normal positions over the hatches.

Figure 5:
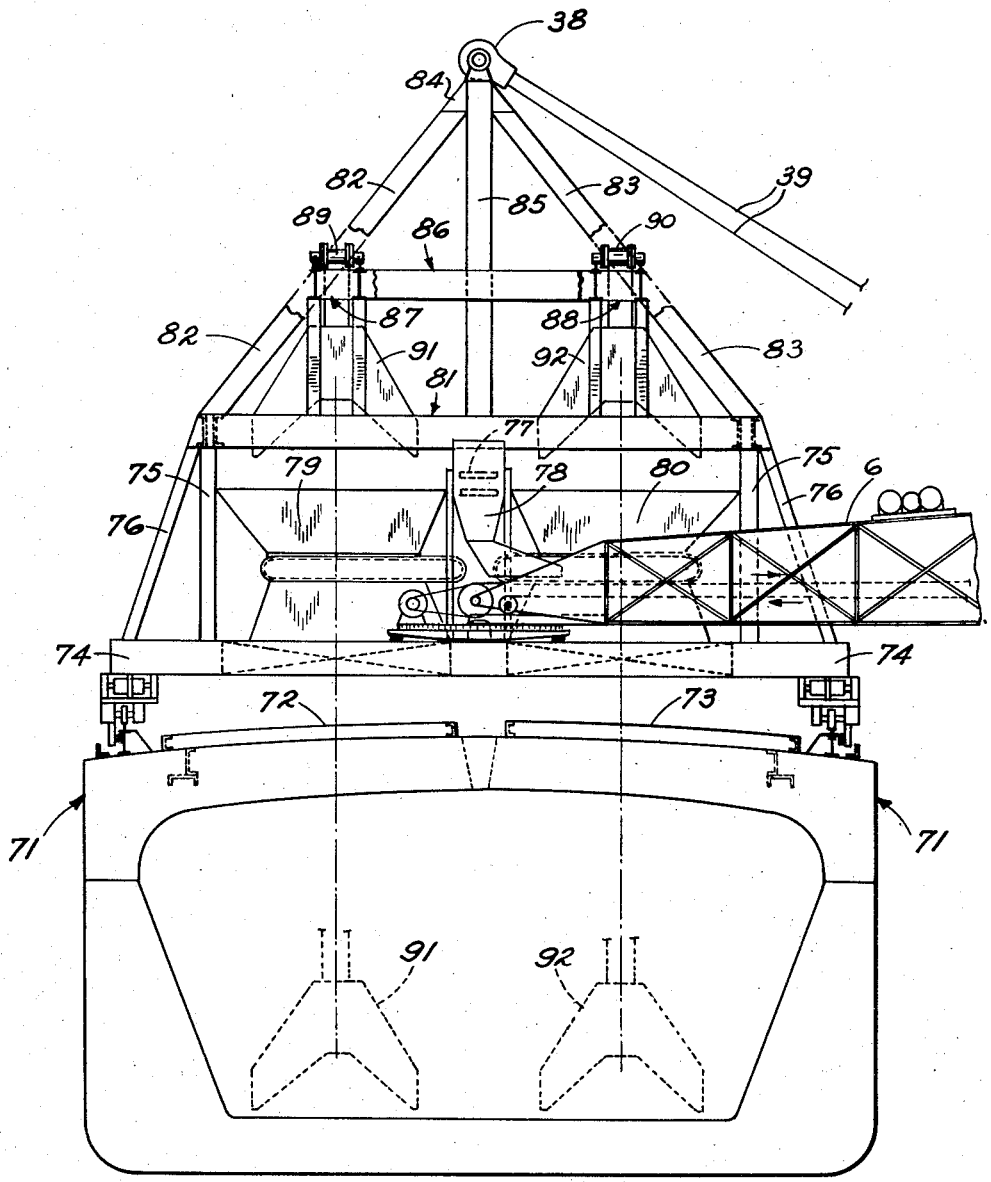
Figure 5 is a similar end elevation of a modified form of unloading unit used on an ocean-going vessel.

The principles of the invention and most of the advantages just mentioned are applicable also to an ocean-going vessel 71 of the type shown in Figure 5. In the ordinary case, such a vessel will have two series of hatches, 72 and 73, one on the port side and one on the starboard side of the centerline. A base 74 of the platform type which is wider than, but otherwise generally similar to, base 7 of the previously described embodiment of the invention extends across the two series of hatches. It is supported from trucks on rails so located that they flank the hatch openings.

On base 74, columns 75 and diagonal struts 76 are located outwardly of centerline conveyor 77, front end hopper 78, and two rear end hoppers 79 and 80. Columns 75 support a first horizontal frame 81 on which is mounted an A-frame consisting of plate girders 82 and 83 and a top piece 84. From the latter an inclined stringer 85 extends rearwardly in much the same manner as stringer 37 in the previously described embodiment of the invention. Above horizontal frame 81 is a second horizontal frame 86, the same supporting bridges 87 and 88 which respectively carry trolleys 89 and 90. Trolley 89 in turn carries bucket 91; trolley 90, bucket 92.

Because of the width of the vessel, which is relatively great, there is no particular reason for mounting buckets 91 and 92 so that their maximum dimensions parallel the longitudinal axis of the vessel. Instead, they may be mounted as shown in Figure 5 with their cleavage planes running parallel to such axis. Each discharges into one of the two hoppers at the rear end of the crane, bucket 91 into hopper 79 and bucket 92 into hopper 80. The cargo is carried forward by centerline conveyor 77 and discharged by the latter into front end hopper 78 over the inboard end of boom 6.

With respect to both the lake ship of Figures 1 to 4 and the ocean-going ship of Figure 5, it should be noted that the unloading unit of the present invention is well adapted for use on dual-purpose vessels; i.e., combination bulk carriers of types designed for handling oil and other liquid cargoes as well as the usual dry cargoes. No elaborate mechanical equipment of the nature of hoppers, bucket conveyors, etc. has to be installed in cargo holds to reduce their cubic content and add unduly to the weight of the vessel. In these same respects, a ship equipped with the unloading unit of the present invention affords important practical advantages over the conventional type of self-unloading vessel, one of these advantages being the fact that more cargo can be carried in a ship of given size and of the same draft.

Where the unloading unit of the present invention is employed, the initial cost of the unloading equipment is far less than the initial cost of the unloading equipment required in a self-unloading vessel of the conventional type. Vessels in which the unloading unit of the present invention is used may be loaded and if necessary unloaded by means of ordinary dock equipment. In most cases, the crane shown in Figure 1 of the accompanying drawings may, if desired, be reversed end for end for cooperation with a cage of the nature of cage 9 disposed immediately to the rear of wheel house 65. In such case, boom 6 will, of course, extend aft rather than forward, as in Figures 1 to 3 of the drawings.

It will be understood that changes going to other features illustrated in connection with the above-described embodiments of the invention may be made and can be expected of those skilled in the art. It is apparent that the unloading unit may, if desired, be used as a part of a shore installation by supporting it on rails flanking a slip or groups of piling adapted to receive a barge, scow or the like. In this situation, the unloading unit will of course extend across and beyond the hold of the vessel. In such circumstances, the unloading unit or the vessel or both may be moved lengthwise of the slip or groups of piling as part of the operation of emptying the hold of its cargo. Other changes of other kinds may likewise be made without departing from the spirit of the invention.

It is intended that the patent shall cover, by summarization in appended claims, all features of patentable novelty residing in the invention.

What is claimed is:

1. An unloading unit for a cargo vessel designed for loading from an overhead shore installation comprising a framework having a base adapted to extend over an opening in the deck of the vessel; means by which the framework may be moved parallel to the longitudinal axis of the vessel; a boom extending from the framework, said boom incorporating means for moving cargo from the inboard end to the outboard end of the boom; means for pivotally supporting the inboard end of the boom; a conveyor extending parallel to the longitudinal axis of the vessel to a discharging zone above the boom from a receiving zone at the opposite end of the framework, the receiving end of said conveyor being mounted on the base; transversely extending hopper means above the receiving end of the conveyor; and, supported from a level above that of the top of said hopper means, a plurality of cargo scoops each of which is susceptible of movement parallel to the longitudinal axis of the vessel into and out of a position over said hopper means, the support level of said cargo scoops being low enough in relation to the deck of the vessel to avoid interference with overhead shore installations.

2. An unloading unit as in claim 1 in which the conveyor extends upward from the base of the framework at a shallow angle to the horizontal.

3. An unloading unit for a cargo vessel designed for loading from an overhead shore installation comprising a framework having a base adapted to fit over the hold of the vessel; means by which the framework may be moved parallel to the longitudinal axis of the vessel; a boom extending from the framework, said boom incorporating a conveyor from moving cargo from the inboard end to the outboard end of the boom; means for pivotally supporting the inboard end of the boom, said means being disposed midway between the sides of the framework; a conveyor extending to a discharging zone above the boom from a receiving zone at the opposite end of the framework the receiving end of said conveyor being mounted on the base; first hopper means in the receiving zone above the receiving end of the conveyor; second hopper means in the discharging zone above the inboard end of the boom; and, supported from a level above the top of said first hopper means, a plurality of cargo scoops each of which is susceptible of movement parallel to the longitudinal axis of the vessel, the support level of said cargo scoops being low enough in relation to the deck of the vessel to avoid interference with overhead shore installations.

4. An unloading unit for a cargo vessel designed for loading from an overhead shore installation comprising a framework adapted to fit over the hold of the vessel; means by which the framework may be moved parallel to the longitudinal axis of the vessel; a boom extending from the framework, said boom incorporating a conveyor for moving cargo from the inboard end to the outboard end of the boom; means for pivotally supporting the inboard end of the boom, said means being disposed midway between the sides of the framework; first hopper means at the end of the framework opposite said supporting means; second hopper means over the inboard end of the boom; a centerline conveyor extending upward at a shallow angle to the horizontal between said first and second hopper means; bridges on the framework paralleling the longitudinal axis of the vessel, said bridges being low enough in relation to the deck of the vessel to avoid interference with overhead shore installations; and, for movement into and out of positions in which they can discharge cargo into said first hopper means, a plurality of trolley-supported cargo scoops adapted for travel lengthwise of said bridges.

5. An unloading unit for a cargo vessel designed for loading from an overhead shore installation comprising a framework adapted to fit over the hold of the vessel; a plurality of cargo scoops supported from the framework, each of them moveable independently of the others; a plurality of conveyors at one end of the framework, said conveyors extending in opposite directions; hopper means beneath the ends of the conveyors; a centerline conveyor extending to the opposite end of the framework from said hopper means, said centerline conveyor being inclined upward at a shallow angle to the horizontal; and, disposed below the discharge end of said centerline conveyor with its inboard end above the longitudinal axis of the vessel, a boom incorporating a conveyor adapted to convey cargo toward the outboard end of the boom, the support level of said cargo scoops being low enough in relation to the deck of the vessel to avoid interference with overhead shore installations.

6. An unloading unit as in claim 5 in which hopper means intervene between the discharge end of the centerline conveyor and the inboard end of the boom.

7. An unloading unit as in claim 6 in which other hopper means intervene between the scoops and the plurality of conveyors at the opposite end of the framework.

8. A self-unloading unit for a cargo vessel designed for loading from an overhead shore installation comprising a framework fitting over an opening in the deck of the vessel; means by which the framework may be moved parallel to the longitudinal axis of the vessel; a boom extending from the framework, said boom incorporating a conveyor for moving cargo from the inboard to the outboard end of the boom; means for pivotally supporting the inboard end of the boom, said means being disposed over the longitudinal axis of the vessel;

a centerline conveyor discharging over the inboard end of the boom, said centerline conveyor extending upward at a shallow angle to the horizontal; transversely extending hopper means over the receiving end of the centerline conveyor; hopper means under the discharge end of the centerline conveyor; and, supported from the framework, a plurality of cargo scoops each of which is moveable parallel to the longitudinal axis of the vessel toward and from said first-mentioned hopper means, the support level of said cargo scoops being low enough in relation to the the deck of the vessel to avoid interference with overhead shore installations.

9. A self-unloading unit as in claim 8 in which said first-mentioned hopper means incorporate a plurality of oppositely directed conveyors.

References Cited in the file of this patent

UNITED STATES PATENTS

| | | |
|---|---|---|
| 1,580,556 | Enard | Apr. 13, 1926 |
| 2,827,180 | Bartenfeld | Mar. 18, 1958 |

FOREIGN PATENTS

| | | |
|---|---|---|
| 589,666 | France | Feb. 26, 1925 |
| 903,678 | Germany | Feb. 8, 1954 |